INVENTOR
RICHARD D. NOLAND
HARRY H. BASORE
BY Fishburn and Gold
ATTORNEYS

United States Patent Office 3,385,033
Patented May 28, 1968

3,385,033
DUST FILTER
Harry H. Basore and Richard D. Noland, Overland Park, Kans., assignors to W. C. Wiedenmann & Son, Inc., Kansas City, Mo., a corporation of Missouri
Filed Nov. 22, 1965, Ser. No. 508,986
3 Claims. (Cl. 55—302)

ABSTRACT OF THE DISCLOSURE

A continuously self-cleaning dust filter of simple construction includes substantially flat filter bags in spaced-apart parallel relation with a nozzle directing dust-laden air in a circular path parallel to and between the sides of the bags. The bags are mounted on frames easily removable from the apparatus by detachable hooks and a simple air flow control system includes flap valves movable alternately between passageway blocking positions which cause filtered air outflow and filter cleaning inflow sequentially with respect to the several filter bags.

---

This invention relates to filters and, more particularly, to dust filters which are continuously self-cleaning in operation.

The principal objects of the present invention are: to provide a dust filter assembly of simple construction which is highly efficient in operation; to provide a device which is easily expanded to increase capacity and easily serviced; to provide such a filter assembly which is continuously and throughly self-cleaning using air or gas under a pressure which is only slightly above the pressure in the dust chamber; to provide such a filter device which uses large substantially flat filter bags to expose large filtering areas to the dust-laden stream with a minimum of structure; to provide such a device wherein advantage is taken of large substantially flat filter areas to produce high cleaning agitation with low cleaning air pressure for dislodging dust particles or the filter surface; to provide such apparatus wherein the dust is deposited on the filter bags in the most advantageous position for cleaning with a low pressure differentia; to provide such a self-cleaning filtering apparatus which uses a simple flap valve having the dual function of preventing normal filtering flow of air into a filter bag while permitting the introduction of cleaning air flow in a reverse direction; to provide such a filter system wherein the respective filter bags need not be isolated from each other in separate chambers and yet, the filter bags may be sequentially inactivated for a short period of time during normal operation for cleaning; and to provide such filtering apparatus which is highly versatile and long lived in use.

Other objects and advantages of this invention will become apparent from the following description taken in connection with the accompanying drawings whrein are set forth by way of illustration and example certain embodiments of this invention.

Figure 1:
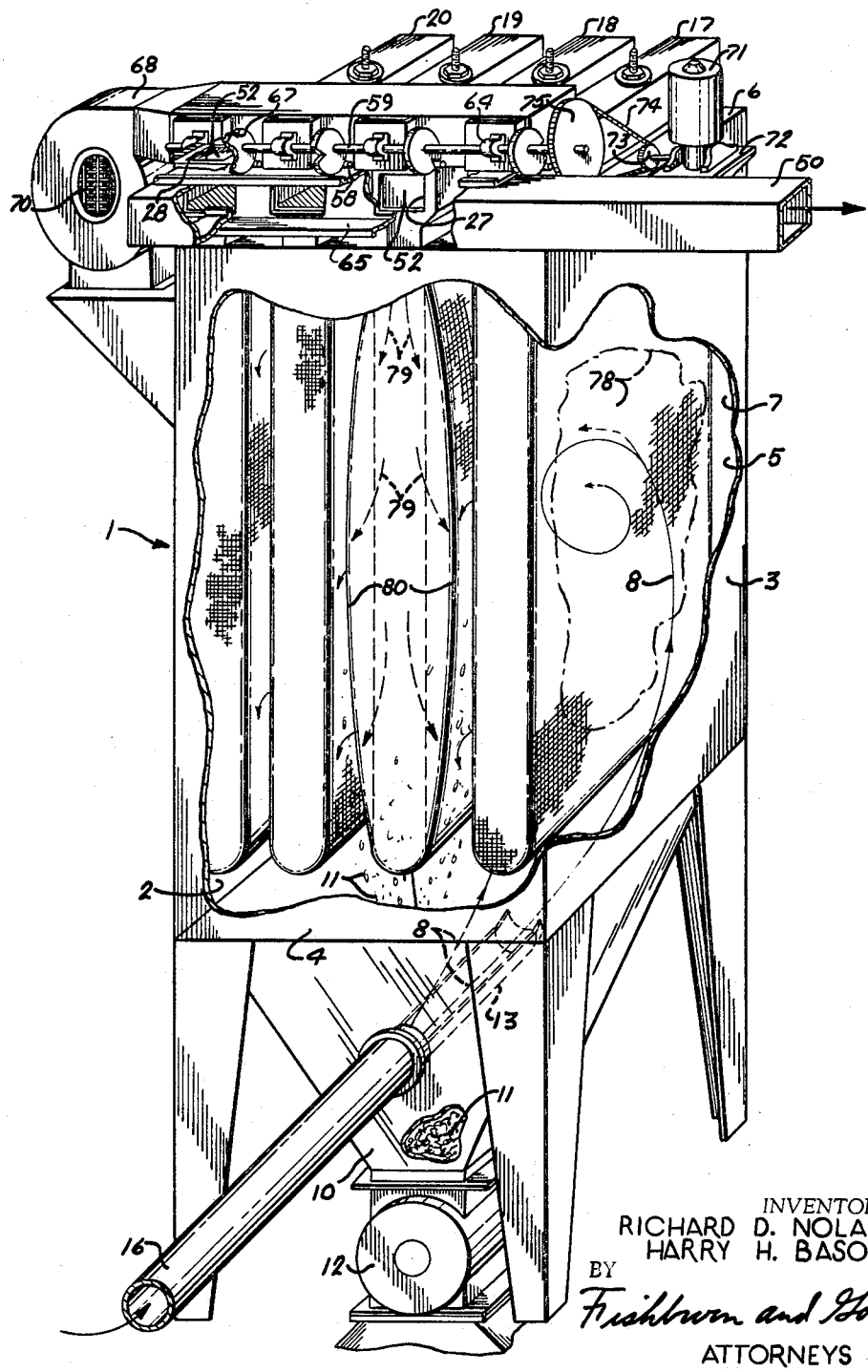
FIG. 1 is a perspective view of filtering apparatus embodying this invention with portions broken away to show interior construction.

Referring to the drawings in more detail:
The reference numeral 1 generally indicates air cleaning apparatus embodying this invention. The apparatus 1 comprises a pair of vertically extending, spaced apart, parallel rectangular side walls 2 and 3, a pair of vertically extending spaced apart rectangular end walls 4 and 5 joined to the walls 2 and 3, and a top wall or plate 6 having outer edges joined to the upper edges of the side walls 2 and 3 and end walls 4 and 5. The walls 2–5 and top wall 6 together form a dust chamber 7 for receiving dust-laden air in a stream 8 as explained below. Inwardly sloping walls 9 have upper edges joined to the lower edges of the side and end walls 2–5 and depend respectively therefrom forming a hopper 10 for receiving dust 11 falling downwardly from the chamber 7. A conventional rotary air lock valve 12 communicates at the lower end of the hopper 10 to discharge dust 11 collected in the hopper without permitting air leakage between the atmosphere and the chamber 7.

An elongated nozzle member 13 extends through one of the hopper walls 9 and projects within the hopper 10 in a direction parallel to the side walls 2 and 3. The nozzle member 13 forms a trough opening upwardly toward the chamber 7 and has an end portion 14 which is bent upwardly for reasons noted hereinafter. A sloping shield 15 covers the nozzle member 13 where it extends through the wall 9 to deflect falling dust away from the open trough formed by the nozzle 13 and thus reduce the recirculation of filtered-out dust within the chamber 7. The nozzle member 13 is fed longitudinally through a suitable input conduit 16. The upwardly open condition of the nozzle member and the bent end portion 14 urge the resultant dust laden air stream 8 generally upwardly from the nozzle member and toward the end wall 5 which further deflects the stream upwardly. As the stream reaches the upper portion of the end wall 5, the top plate 6 causes deflection across the chamber 7 at the upper portion thereof and then the end wall 4 causes downward deflection toward the hopper 10. The result is that the dust laden stream is caused to move in a generally circular and inwardly spiraling path parallel to the side walls 2 and 3 as illustrated in FIG. 1.

A plurality of elongated manifold conduits designated 17, 18, 19 and 20 are mounted on the top plate 6 and extend in laterally spaced apart relation parallel to the side walls 2 and 3. The manifold conduits 17–20 each open downwardly through the top plate as indicated at 21, FIG. 2, and have a top wall 22, side walls 23 and 24 and end walls 25 and 26. Adjacent air passage openings respectively designated 27 and 28 are formed in the respective end walls 26 and top walls 22 for a purpose noted hereinafter.

Figure 2:
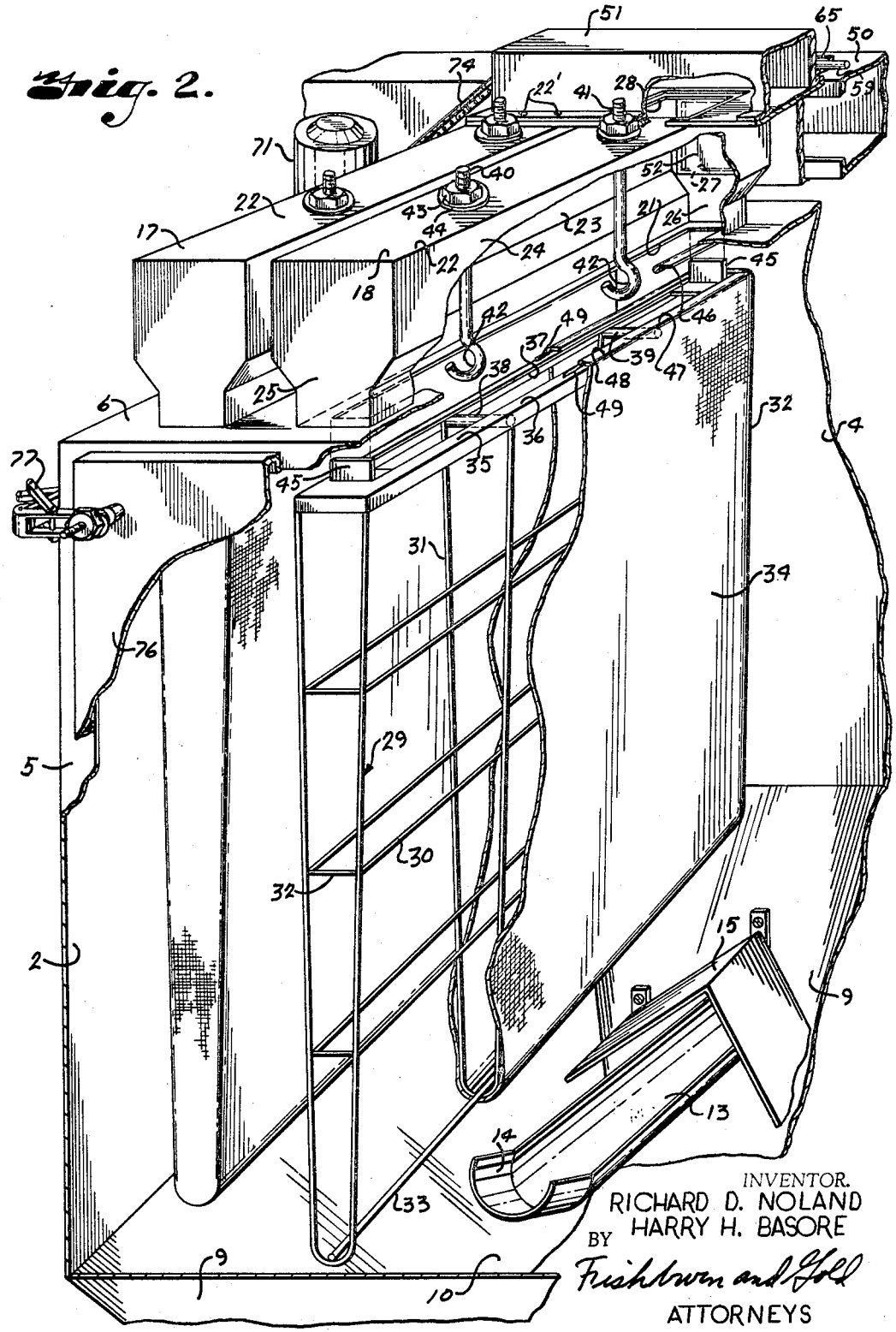
FIG. 2 is a fragmentary perspective view of the apparatus on an enlarged scale, particularly showing the filter bag, frame and supporting structure, and the dusty air introducing nozzle.
Figure 3:
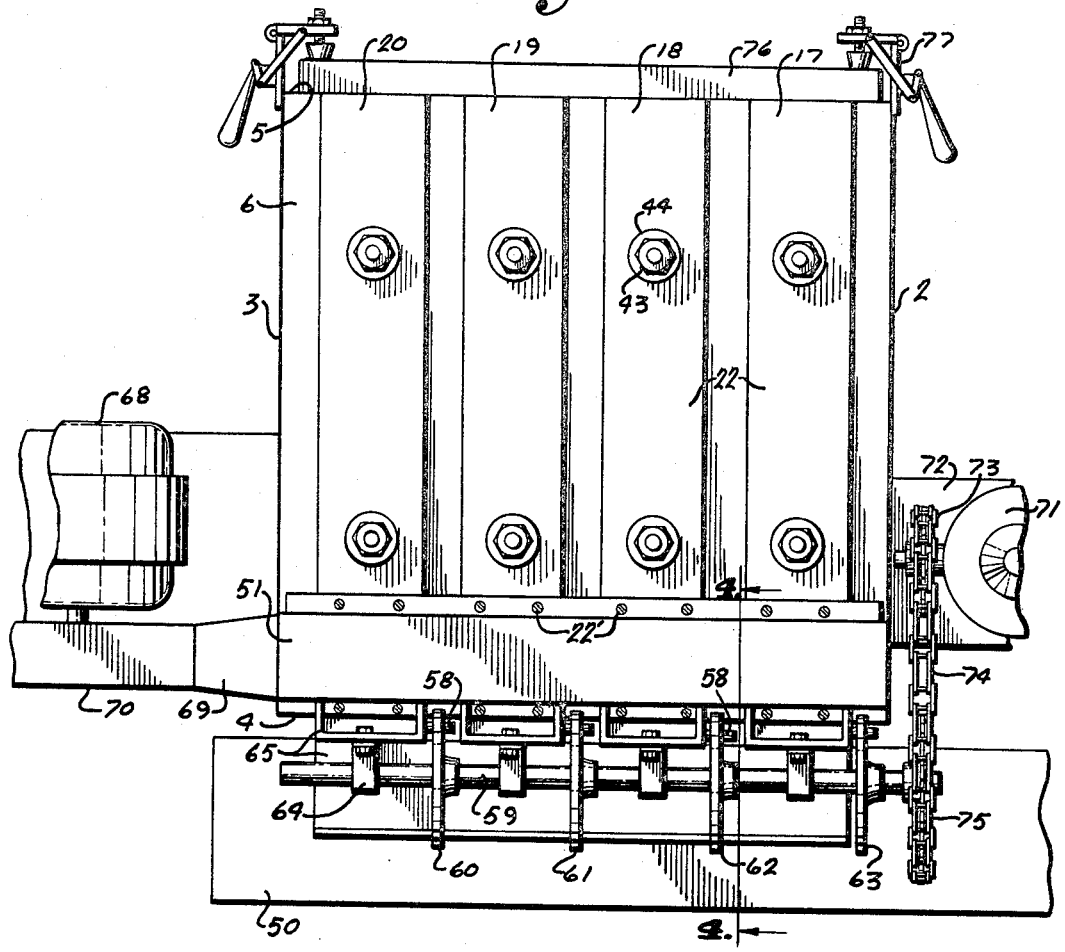
FIG. 3 is a fragmentary top plan view of the apparatus particularly showing the cam control members.

Rectangular parallel laterally spaced apart filter bag frames 29 are disposed in the dust chamber 7 and each frames 29 have a pair of spaced apart lattice side walls 30 and 31 and end walls 32 and a bottom wall 33 for supporting filter bags 34 thereon against inward collapse. The frame side walls 30 and 31 are of substantially greater area than the end walls 32 or bottom walls 33 whereupon the bag frames 29 take the general form of a relatively flat rectangular box. The frames 29 each include a top wall 35 comprising a continuous rim 36 extending around the top of the frame 29 and forming an elongated mouth 37 communicating with the space between the lattice side walls 30 and 31. The frames 29 each have a pair of spaced apart support bars 38 and 39 extending transversely across the mouth 37 and rigidly secured to structural members of the frame. A pair of spaced apart suspending members 40 and 41 extend downwardly through the top wall 22 of each of the manifold conduits 17–20 and terminate the lower ends thereof in hooks 42 adapted to engage the bars 38 and 39 for supporting the respective frames 29 in a downwardly extending condition within the chamber 7. The members 40 and 41 are threaded at the upper ends thereof and suitable nuts 43 are engaged therewith and sealing washers 44 placed thereon for sealing the opening through which the member extends and adjusting the vertical position of the hook 42. As illustrated in FIG. 2, when the hook 42 is engaged with the respective bar 38 or 39 and the nut 43 tightened, the frame 29 is drawn upwardly toward engagement with the underside of the top plate 6. Suitable guides 45 extend upwardly from the frame top wall 35 and are adapted to be received into the opening at 21 between the respective manifold conduits 17–20 and the top plate 6. The guides 45 accurately position the frame into proper relation with the top plate 6 so that the mouth 37 aligns with the opening at 21 into the manifold conduit. An elongated flexible sealing strip 46 is positioned to produce a seal between the frame rim 36 and the top plate 6 when engagement occurs.

The filter bags 34 open at the top 47 thereof and have top edges 48 with a draw string 49 therein to pull the edges 48 into tight engagement with the frame rim 36 but not obstructing the mouth 37. Thus, the top edges 48 of the bag engage the sealing strip 46 with the rim 36 therebeneath whereupon the bag 34 opens only into the respective manifold conduit 17–20 and there is no path into or out of the bag from the chamber 7 except through the filtering fabric forming the bag.

Figure 4:
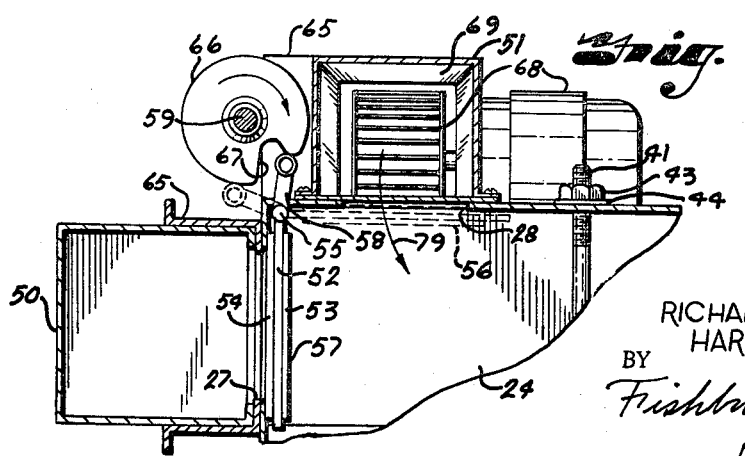
FIG. 4 is a cross-sectional view taken on the line 4—4, FIG. 3, showing the relatonship between a flap valve and a controlling cam.

A filtered air exhaust conduit 50 extends transversely of the manifold conduits 17–20 adjacent the end walls 26 and communicates with the end wall openings 27. A clean air header conduit 51 extends parallel and adjacent to the conduit 50 and is secured on the manifold conduit top walls 22 by suitable screws 22'. The clean air header conduit 51 communicates with each of the top wall openings 28. A flap valve 52 is located in each of the manifold conduits 17–20 and, in the illustrated example, has soft resilient sealing members 53 and 54 on opposite sides thereof. Suitable hinge members 55 mount the flap valves 52 within the respective conduits 17–20 for pivotal movement between a position blocking the top wall openings 28, as illustrated by the broken lines at 56 (FIG. 4), to a position blocking the end wall openings 27 as indicated at 57. Cam followers 58 are respectively engaged with the flap valves 52 and extend exteriorly of the respective manifold conduit.

A cam shaft 59 extends transversely of the manifold conduits 17–20 and has a plurality of spaced apart generally circular cams respectively designated 60, 61, 62 and 63 mounted thereon for rotation therewith. Bearing blocks 64 are suitably secured to supporting structure 65 carried by the manifold conduits 17–20 and rotatably mount the cam shaft 59 with the respective cams 60–63 in engagement with the respective cam followers 58. The cams 60–63 each have a camming periphery 66 over the major portion of the circumference thereof which is on a diameter which urges the flap valves 52 to the top wall opening blocking position indicated by the broken lines at 56. A minor portion 67 of the camming periphery is shaped to cause or permit the flap valve 52 to assume an end wall opening blocking position 57, FIG. 4. Movement of the flap valve 52 to the position 57, in the illustrated example, is accomplished by gravity and differential pressure; however, if desired, a spring assist (not shown) or the like may be used. The minor portion peripheries 67 are circumferentially staggered with respect to adjacent cams whereby at all times a major proportion of the flap valves 52 are in blocking position against the opening 28, but each of the flap valves are momentarily and sequentially caused to move to blocking position against the opening 27 during a revolution of the cam shaft 59.

A blower 68 of sufficient capacity to maintain an output pressure of approximately ¼ to 2 pounds per square inch above intake pressure communicates at the output thereof through a joining conduit 69 with the clean air header conduit 51. The blower 68 is illustrated with an intake mouth or opening 70 which is exposed to ambient air. This arrangement assumes that the ambient air is clean, that is, substantially free from dust. If the ambient air is not clean, the intake 70 may be connected to the exhaust conduit 50 through a conduit (not shown) so as to obtain filtered air for the blower intake. Also, if desired, the blower directed into the conduit 51 may be dispensed with in favor of means (not shown) producing a vacuum in the exhaust conduit 50. A gear motor 71 is mounted on a suitable bracket 72 secured to the side wall 3 and has an output sprocket 73 engaging a chain 75 which is, in turn, engaged with a sprocket 75 secured to the cam shaft 59. Thus, the gear motor 71 rotates the cams 60–63 at a desired speed in unison.

A major portion of the end wall 5 comprises an access door 76 which may be easily opened or removed by operating quick acting clamps 77 so as to expose one entire end of the chamber 7, thus providing access for inserting and removing one or more of the frames 29 and/or bags 34.

In operation, a dust laden air stream 8 is directed through the conduit 16 into the nozzle member 13 where, as noted above, it is directed into an upwardly and inwardly spiraling circular path parallel to the side walls 2 and 3 within the chamber 7. The air stream 8 thereby moves parallel to and between the respective filter bag frames 29 in a vertical circular motion which, due to a pressure difference in the manifold conduits 17–20 and the chamber 7, is forced through the bag material at areas 78 (FIG. 1) located generally centrally of the filter frames on the lattice side walls 30 and 31. Dust is thereby deposited on the exterior of the bags generally in the area 78 while the filtered air exhausts upwardly through the mouth 37 into the manifold conduits and then through the end wall openings 27 into the exhaust conduit 50. During this filter operation, the blower 68 or vacuum producing means (not shown) is operated whereupon a pressure is maintained in the clean air header conduit 51, for example, ½ pound per square inch above that in the chamber 7. The cams 60–63 driven by the gear motor 71 sequentially momentarily cause the respective flap valves 52 to close the respective manifold conduit openings 27 while it opens the respective clean air header conduit openings 28. The greater pressure air in the clean air header conduit then flows downwardly as indicated by the arrow 79 into the respective filter bag through the mouth 37 causing the normal direction of air flow to reverse within the bag. Because large flat surfaces of the bag are unsupported against limited outward deflection, the relatively small pressure differential causes the side wall portions 80 (FIG. 1) to violently move outwardly from the respective frame 29 and pop to a taut condition with the fabric somewhat stretched. The dust 11 collected on the bags, particularly in the general central areas 78, is thereby shocked or exploded off the surface where it falls by means of gravity down into the hopper 10 where it collects for removal by the air lock valve 12. The reverse air flow through the bag, which occurs after the taut condition of the fabric is obtained, helps remove additional dust particles which are lodged within the threads of the bag fabric. As the respective cam continues to turn, the reverse air flow is halted in the cleaned bag and flow begins in the opposite or normal direction for filtering air within the chamber 7.

Due to the configuration of the filter assembly, it is a simple matter to increase filtering capacity. This may be accomplished by merely extending the end walls 4 and 5 so as to increase the size of the chamber 7 and providing additional filter bag frames, bags, manifold conduits, flap valves and blower capacity. The cam shaft 59 may then be extended and the cams readjusted for desired sequence of operation.

The lack of high pressure air for cleaning eliminates the water discharge problem normally associated with this type of filter cleaner and does not place a load on the commonly overloaded compressed air systems in many industrial plants or require expensive new compressed air installations. Further, this improved filter does not require the complex traveling members or vibrating apparatus heretofore needed for most continuously operating filters.

Although one form of this invention has been illustrated and described, it is not to be limited thereto except insofar as such limitations are included in the following claims.

What we claim and desire to secure by Letters Patent is:

1. A gas cleaner comprising vertical side walls and end walls and top and bottom walls forming a dust chamber, one of said chamber walls comprising a plate, means for introducing dust-laden gas into said chamber, said cleaner further comprising:
    (a) a plurality of top, side and end walls forming a plurality of manifold conduits mounted on said plate in laterally spaced relation, said manifold conduits each opening through said plate, said manifold conduit walls including a first wall and an adjoining adjacent second wall, means forming adjacent gas passage openings in each of said manifold conduit first and second walls, a plurality of laterally spaced-apart filter bag elements disposed in said dust chamber and respectively aligned with said conduits,
    (b) said filter bag elements having an end wall forming a mouth opening thereinto, means for maintaining said mouth in sealing engagement with said plate about the openings in said plate with said respective mouths communicating with said manifold conduits,
    (c) a filtered gas exhaust conduit connected to and communicating with said second wall gas passage openings, a clean gas header conduit connected and communicating with said first wall openings,
    (d) a flap valve in each of said manifold conduits, hinge members mounting each of said flap valves at an end thereof adjacent to and intermediate said first and second openings for pivotal movement between a position flush against said first wall and blocking said first wall opening and a position flush against said second wall and blocking said second wall opening, actuators connected to said hinge members, motive means engaging said actuators for moving said flap valves between said first and second openings of the manifold and continuously maintaining a major proportion of said flap valves in a first wall opening blocking position while momentarily and sequentially urging a minor proportion of said flap valves into said second wall opening blocking position, and
    (e) means for continuously maintaining clean gas in said clean gas header at a pressure above the gas pressure in said dust chamber.

2. The air cleaner as set forth in claim 1 wherein:
    (a) said motive means comprises cam followers respectively associated with said actuators, a cam shaft extending transversely of said manifold conduits and having a plurality of spaced apart rotary cams thereon, means rotatably mounting said cam shaft adjacent said flap valves with said cams respectively engaging said cam followers,
    (b) said cams having a camming periphery on the major portion of the circumference thereof which is shaped to urge portion of said camming periphery being shaped to cause the flap valve to assume said second wall opening blocking position, said minor portion peripheries being circumferentially staggered on said respective cams, and
    (c) means for rotating said cam shaft.

3. A gas cleaner comprising vertical side walls and vertical end walls and a bottom wall and a top plate forming a dust chamber, means for introducing dust-laden air into said dust chamber, said cleaner further including:
    (a) a plurality of top, side and end walls forming a plurality of elongated parallel laterally spaced-apart manifold conduits mounted on said top plate, said manifold conduits each opening downwardly through said top plate and including a filtered air outlet and a clean glass inlet, said conduit top walls being rigid and supported by said side and end walls,
    (b) a plurality of relatively flat laterally spaced-apart filter bag lattice frames disposed in said dust chamber parallel to said manifold conduits, said frames defining a volume therein, filter bags mounted about said frames,
    (c) said frames each having a top wall comprised of a rim forming an elongated mouth communicating downwardly within said frame,
    (d) suspending members extending downwardly through and including means removably engaging said respective manifold conduit top walls, said suspending members projecting below said top walls and through said respective top plate openings and terminating in lower upwardly open hooks,
    (e) bars extending transversely across said mouth and engaged with said rims, said hooks removably engaging said bars maintaining said rims in sealing engagement with said top plate with said respective mouths communicating with said respective manifold conduits.

References Cited

UNITED STATES PATENTS

| 1,153,751 | 9/1915 | Beth | 55—304 |
| 1,818,736 | 8/1931 | Moore | 55—304 |
| 1,974,952 | 9/1934 | Eiben | 55—291 |
| 2,607,436 | 8/1952 | Martin | 55—418 |
| 2,723,726 | 11/1955 | Pellon | 55—287 |
| 2,732,912 | 1/1956 | Young | 55—290 |
| 3,057,137 | 10/1962 | Perlis | 55—341 |
| 3,243,940 | 4/1966 | Larson | 55—291 |
| 3,266,225 | 8/1966 | Barr | 55—303 |
| 3,277,633 | 10/1966 | Smoot | 55—302 |

FOREIGN PATENTS

| 700,483 | 12/1964 | Canada. |
| 8,260 A.D. | 1914 | Great Britain. |
| 974,144 | 11/1964 | Great Britain. |

HARRY B. THORNTON, *Primary Examiner.*

B. NOZICK, *Assistant Examiner.*